United States Patent [19]
Yuen et al.

[11] 3,788,042
[45] Jan. 29, 1974

[54] GAS-LIQUID CONTACTING APPARATUS

[76] Inventors: Yat Chuen Yuen; Kin Sun Yuen, both of 17th Floor, Flat L, Phoenix Apartment 70, Lee Garden Rd., Hong Kong

[22] Filed: Mar. 16, 1972

[21] Appl. No.: 235,312

[30] Foreign Application Priority Data
Mar. 24, 1971 Great Britain...................... 7,704/71

[52] U.S. Cl...................... 55/227, 23/284, 55/256, 55/DIG. 30, 60/310, 261/122
[51] Int. Cl............................................ B01h 47/02
[58] Field of Search ..... 55/227, 228, 233, 236, 244, 55/248, 256, DIG. 30; 60/310; 23/284; 261/122, 77; 210/311, 456

[56] References Cited
UNITED STATES PATENTS
1,756,897 4/1930 Bilsky ............................ 55/DIG. 30
2,164,833 7/1939 Norman................................ 55/227
2,849,295 8/1958 Ruth ............................ 55/DIG. 30

*Primary Examiner*—Bernard Nozick
*Attorney, Agent, or Firm*—Donald D. Jeffery

[57] ABSTRACT

The invention provides device for cleaning exhaust gas, particularly automobile exhaust gas, which device includes a screen immersed in a liquid and surmounted by an inverted trough having closed ends such that at least a part of the gas fed to the trough will pass more than once through the screen before reaching the gas outlet.

4 Claims, 3 Drawing Figures

GAS-LIQUID CONTACTING APPARATUS

This invention relates to apparatus for contacting a gas with a liquid and more particularly to apparatus for cleaning exhaust gases, for example from automobile engines.

Known exhaust gas cleaning apparatuses are relatively complex devices in which the exhaust gas is passed through several layers of catalyst material before being vented to the atmosphere. In time the catalysts lose their catalytic activity, often because of poisoning e.g. by lead which is almost always present in automobile exhaust gases, and must be replaced. This can be a laborious and costly procedure.

An object of the present invention is to provide a simple and effective gas cleaning device which avoids the abovementioned problems associated with known devices.

A further object of the invention is to provide an exhaust gas cleaning device in which at least part of the gas is passed more than once through the same filter screen before it leaves the apparatus.

According to the invention there is provided apparatus for contacting a gas with a liquid which comprises a first, open-topped, chamber contiguous with a second, open-bottomed, chamber, said second chamber being situated above said first chamber when the apparatus is in use and being separated therefrom by a perforated screen; an inlet pipe for introducing gas into the first chamber; an outlet pipe for removing gas from the second chamber; means for introducing a liquid into the apparatus, and an inverted trough having closed ends mounted in the second chamber above the end of the inlet pipe, the mouth of the trough being in contact with and extending over a part of the screen.

Preferably the inlet pipe passes through a wall of the trough and extends into the first chamber through an aperture in the screen.

In an embodiment of the invention, the means for introducing liquid into the apparatus includes a float valve whereby, when the apparatus is in use, the level of liquid in the apparatus can be maintained above the screen. Desirably, the said means includes a supply pipe which passes through the wall of the trough, the float valve being situated substantially within the trough.

The invention also provides a method of treating a gas which comprises passing the gas through apparatus according to the invention, the first chamber being filled with liquid such that the screen and the mouth of the trough are immersed in the liquid whereas the gas outlet pipe is situated above the level of the liquid. The liquid may be water or a solution of a chemical compound capable of reacting with a component of the gas being treated. If desired, the gas may be passed through a plurality of apparatuses according to the invention connected in series.

The invention will now be particularly described with reference to the accompanying drawings, in which.

Figure 1:
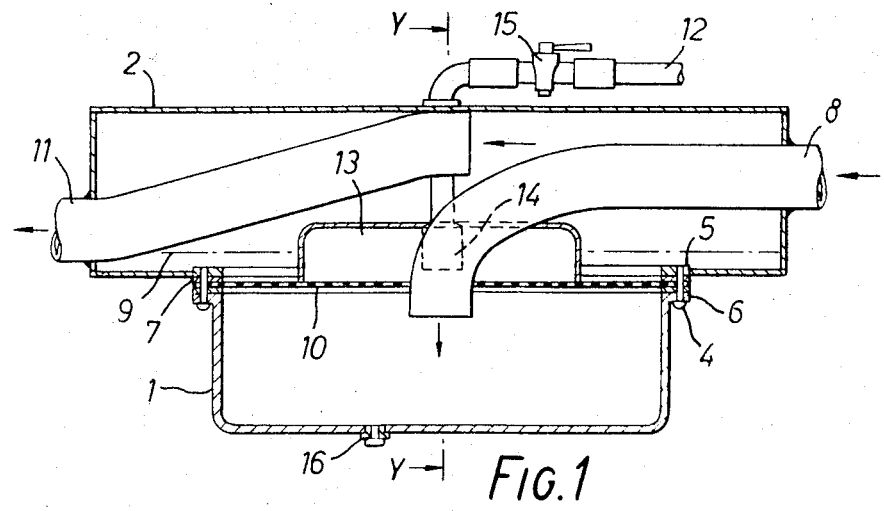
FIG. 1 is a vertical section of an apparatus according to the invention, said section being taken along the line X—X as shown on FIG. 2.
Figure 2:
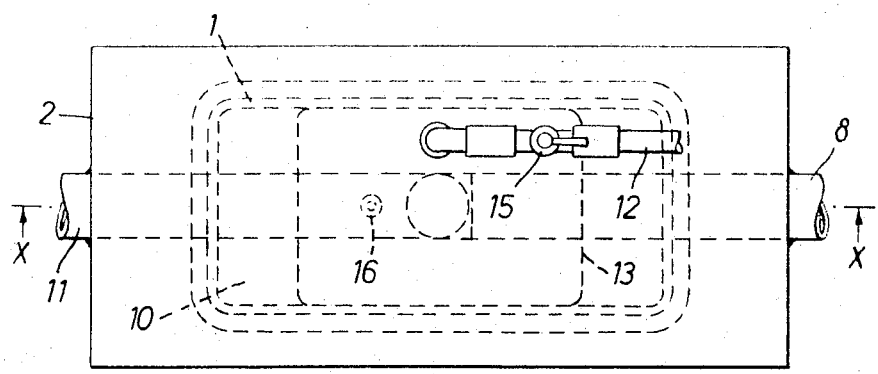
FIG. 2 is a top view of the apparatus shown in FIG. 1.
Figure 3:
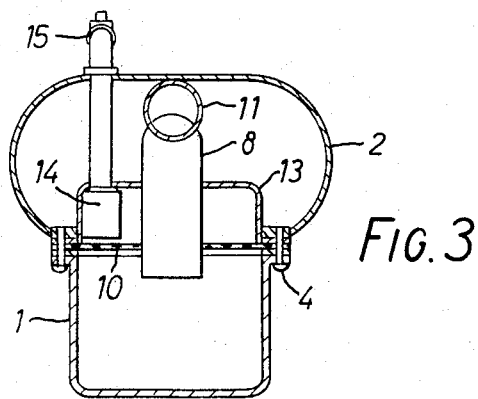
FIG. 3 is a second vertical section taken along the line Y—Y shown on FIG. 1.

The FIGS. illustrate an apparatus for cleaning exhaust gases comprising a first chamber 1 contiguous with a second chamber 2, the two chambers having co-operating flanges 6 and 5 and being secured together by bolts 4. A gasket 7 prevents leakage of fluid from the apparatus. One or more perforated screens 10 separate the first chamber from the second chamber and an inverted trough 13 having closed ends is mounted in the second chamber such that its mouth is in contact with the screen or screens 10. The area of the mouth of the trough is less than the area of the screen or screens 10 such that gas can pass from the first chamber into the second chamber. A gas inlet pipe 8 passes through the wall of the second chamber and through the trough 13 and finally through an aperture in the screen 10 to terminate in the first chamber beneath the inverted trough 13. A gas outlet pipe 11 is mounted in the wall of the second chamber 2. The apparatus is provided with means for supplying liquid, comprising a liquid supply pipe 12, a stop-cock 15 and a float valve 14. When the apparatus is in use, the float valve 14 maintains the liquid in the apparatus to the level indicated at 9. A drain plug 16 is provided whereby liquid can be drained from the apparatus after use.

The preferred operation of the apparatus will now be described. The liquid supply pipe 12 is first connected to a suitable liquid supply which may comprise a water reservoir. The liquid may be a solution of a chemical compound, for example sodium hydroxide or calcium hydroxide, which is capable of reacting with an impurity in the gas to be cleaned. The float valve will ensure that the apparatus is filled with liquid to the level 9. After filling, the gas to be cleaned is introduced by way of the inlet pipe 8 and bubbles through the liquid in the first chamber 1. The bubbles of gas will rise to the top of the said first chamber and pass through the screen or screens 10 which will remove at least part of any particulate material, e.g. soot, carried by the gas. A substantial part of the gas passing through the screen 10 will find its way into the inverted trough 13 where it will collect, there being no aperture in the trough through which it can escape. The remainder of the gas will pass directly into the chamber 2 through the part of the screen which extends outside the mouth of the trough 13. The trough 13 will fill with gas as the apparatus is used and, when it is full, gas entering the trough will force gas out around the lower edge of the trough. On leaving the trough, this gas will pass through the screen 10 back into the chamber 1 and then again through the screen 10 into the chamber 2. In this way at least part of the gas will be filtered more than once as it passes through the apparatus. Once the cleaned and filtered gas reaches the chamber 2 it leaves the apparatus through the outlet pipe 11. The screen or screens 10 not only serve to remove some of the particulate material in the gas being treated but also to break up the bubbles of gas as they pass through into the second chamber. This substantially improves the contact between the gas and the liquid in the apparatus thereby increasing the amount of gaseous impurities which are dissolved.

After use, the liquid supply can be interrupted by turning the stop cock 15 and the apparatus can be drained of liquid through the drain plug 16. If desired liquid may be continuously withdrawn through the drain plug 16 and replenished through the liquid supply pipe 12 during operation of the apparatus in order that the liquid shall remain active while the gas being cleaned passes through the apparatus.

The liquid may be water or a solution of a compound such as calcium hydroxide which will react with a component of the gas being cleaned. For example, an alkaline solution will tend to remove gases such as sulphur dioxide and nitrogen dioxide which form acids when dissolved in water. Of course the liquid may consist of or include an organic compound for dissolving organic impurities from the gas being treated.

If desired the gas to be cleaned may be passed through a series of the apparatuses as described above connected in series. Also, it may be desirable when using one or more of the apparatuses to provide a pump in the gas inlet or outlet pipe to assist the flow of gas through the apparatus.

We claim:

1. Apparatus for contacting a gas with a liquid comprising:
   a. a first, open-topped, chamber,
   b. a second, open-bottomed, chamber situated above the first chamber and contiguous therewith,
   c. a perforated screen separating the first chamber from the second chamber,
   d. an inlet pipe for introducing gas into the first chamber,
   e. an outlet pipe for removing gas from the second chamber,
   f. means for introducing a liquid into the apparatus, and
   g. an inverted trough having closed ends, the mouth of the trough being in contact with and extending over a part of the screen.

2. The apparatus of claim 1, wherein the inlet pipe passes through a wall of the trough and extends into the first chamber through an aperture in the screen.

3. The apparatus of claim 1, wherein the said means includes a float valve, whereby, when the apparatus is in use, the level of liquid in the apparatus can be maintained above the screen.

4. The apparatus of claim 3, wherein the said means includes a liquid supply pipe which passes through the wall of the trough, the float valve being situated substantially within the trough.

* * * * *